(12) United States Patent
Yuwaki et al.

(10) Patent No.: US 11,511,489 B2
(45) Date of Patent: Nov. 29, 2022

(54) THREE-DIMENSIONAL SHAPING DEVICE AND MANUFACTURING METHOD FOR THREE-DIMENSIONAL SHAPED ARTICLE

(71) Applicant: Seiko Epson Corporation, Tokyo (JP)

(72) Inventors: Kohei Yuwaki, Tsukuba (JP); Koichi Saito, Matsumoto (JP)

(73) Assignee: SEIKO EPSON CORPORATION

( * ) Notice: Subject to any disclaimer, the term of this patent is extended or adjusted under 35 U.S.C. 154(b) by 318 days.

(21) Appl. No.: 16/853,793

(22) Filed: Apr. 21, 2020

(65) Prior Publication Data

US 2020/0331204 A1    Oct. 22, 2020

(30) Foreign Application Priority Data

Apr. 22, 2019  (JP) .............................. JP2019-080852

(51) Int. Cl.
| | | |
|---|---|---|
| *B29C 64/295* | (2017.01) | |
| *B33Y 10/00* | (2015.01) | |
| *B33Y 30/00* | (2015.01) | |
| *B29C 64/153* | (2017.01) | |
| *B22F 12/00* | (2021.01) | |
| *B22F 10/10* | (2021.01) | |

(52) U.S. Cl.
CPC ............ *B29C 64/295* (2017.08); *B22F 12/00* (2021.01); *B29C 64/153* (2017.08); *B33Y 10/00* (2014.12); *B33Y 30/00* (2014.12); *B22F 10/10* (2021.01)

(58) Field of Classification Search
CPC ..... B29C 64/364; B29C 64/295; B29C 64/25; B29C 64/379; B29C 64/232; B29C 64/245
See application file for complete search history.

(56) References Cited

U.S. PATENT DOCUMENTS

| | | | | |
|---|---|---|---|---|
| 5,996,353 A | * | 12/1999 | Maxwell ................ | F25B 21/02 62/3.2 |
| 2017/0129181 A1 | | 5/2017 | Kunioka | |
| 2017/0210068 A1 | | 7/2017 | Kunioka | |

(Continued)

FOREIGN PATENT DOCUMENTS

| | | |
|---|---|---|
| EP | 3263316 A1 | 1/2018 |
| JP | 2003-502184 A | 1/2003 |

(Continued)

*Primary Examiner* — Matthew J Daniels
(74) *Attorney, Agent, or Firm* — Harness, Dickey & Pierce, P.L.C.

(57) ABSTRACT

A three-dimensional shaping device includes a chamber that has a shaping space; a heating unit configured to heat the shaping space; a base that has a shaping surface exposed to the shaping space; a discharge unit configured to discharge a shaping material toward the shaping surface while moving in a first direction in the shaping space heated by the heating unit and shape a three-dimensional shaped article; a first drive unit configured to move the base in a second direction crossing the first direction; and a tubular first heat resistant member that is disposed between a peripheral part of a first opening formed in a partition wall of the chamber and the base, configured to extend and contract in the second direction in accordance with a movement of the base in the second direction, and defines a separation space separated from the shaping space, in which at least a part of the first drive unit is disposed in the separation space.

5 Claims, 11 Drawing Sheets

(56) References Cited

U.S. PATENT DOCUMENTS

| | | | |
|---|---|---|---|
| 2018/0339455 A1* | 11/2018 | Cohen | B33Y 40/00 |
| 2019/0263063 A1* | 8/2019 | Karlsson | B23K 15/002 |
| 2020/0009794 A1* | 1/2020 | Bracha | B29C 64/245 |
| 2020/0070415 A1* | 3/2020 | Bracha | B29C 64/393 |
| 2021/0016493 A1* | 1/2021 | Bracha | B29C 64/286 |

FOREIGN PATENT DOCUMENTS

| | | |
|---|---|---|
| JP | 2017-087562 A | 5/2017 |
| JP | 2017-132073 A | 8/2017 |
| JP | 2017-193151 A | 10/2017 |
| JP | 2017-217792 A | 12/2017 |
| JP | 2018-130836 A | 8/2018 |
| WO | 2000-078519 A1 | 12/2000 |
| WO | 2018/163006 A1 | 9/2018 |

* cited by examiner

THREE-DIMENSIONAL SHAPING DEVICE AND MANUFACTURING METHOD FOR THREE-DIMENSIONAL SHAPED ARTICLE

The present application is based on, and claims priority from JP Application Serial Number 2019-080852, filed Apr. 22, 2019, the disclosure of which is hereby incorporated by reference herein in its entirety.

BACKGROUND

1. Technical Field

The present disclosure relates to a three-dimensional shaping device and a manufacturing method for a three-dimensional shaped article.

2. Related Art

In a three-dimensional shaping device described in JP-T-2003-502184, a three-dimensional shaped article is shaped in a heated chamber. A base on which a shaping material extruded from an extrusion head is adhered is disposed in the chamber, and a lift as a drive unit that moves the base in a vertical direction is disposed outside the chamber. The base in the chamber and the drive unit outside the chamber are coupled by a beam through a slit opened in the vertical direction on a side wall of the chamber.

In the three-dimensional shaping device described in JP-T-2003-502184, as described above, the base and the drive unit are coupled through the slit. Therefore, heated air in the chamber may leak toward the drive unit through the slit. When the drive unit is exposed to the heated air, thermal influence may affect the drive unit and shaping accuracy of a three-dimensional shaped article. For example, when thermal influence affects the drive unit that moves the base up and down, a gap between the base and the head may change due to expansion of a shaft member provided in the drive unit, which may affect the shaping accuracy.

SUMMARY

According to one aspect of the present disclosure, a three-dimensional shaping device is provided. The three-dimensional shaping device includes a chamber that has a shaping space; a heating unit configured to heat the shaping space; a base that has a shaping surface exposed to the shaping space; a discharge unit configured to discharge a shaping material toward the shaping surface while moving in a first direction in the shaping space heated by the heating unit and shape a three-dimensional shaped article; a first drive unit configured to move the base in a second direction crossing the first direction; and a tubular first heat resistant member that is disposed between a peripheral part of a first opening formed in a partition wall of the chamber and the base, configured to extend and contract in the second direction in accordance with a movement of the base in the second direction, and defines a separation space separated from the shaping space, in which at least a part of the first drive unit is disposed in the separation space.

DESCRIPTION OF EXEMPLARY EMBODIMENTS

A. First Embodiment

Figure 1:
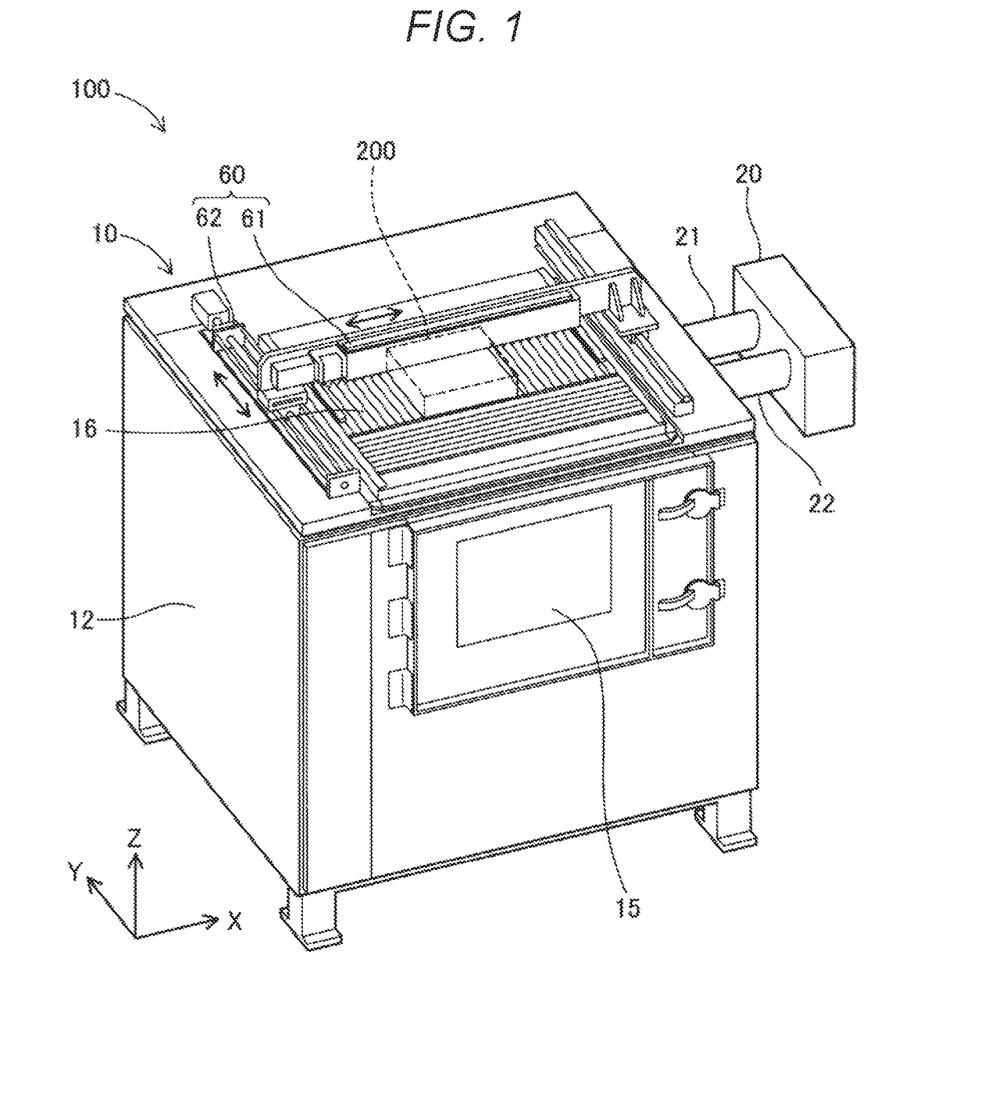
FIG. 1 is an external perspective view of a three-dimensional shaping device according to a first embodiment.
Figure 2:
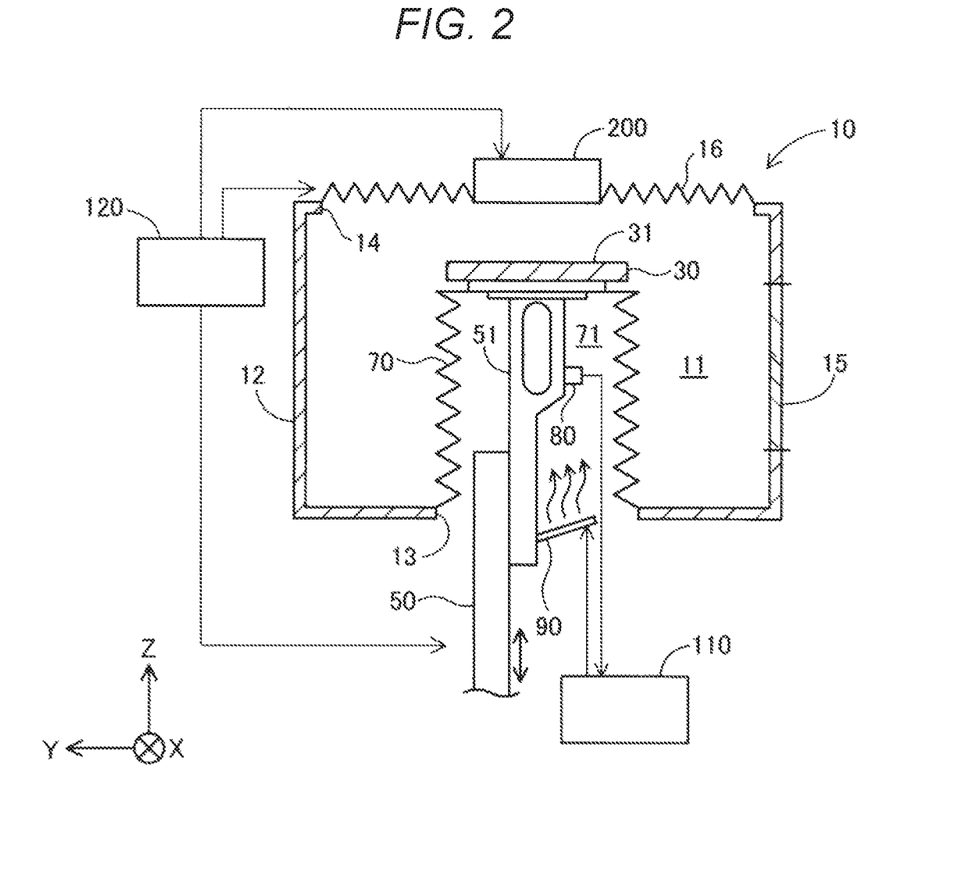
FIG. 2 is a schematic cross-sectional view showing an internal configuration of the three-dimensional shaping device.

FIG. 1 is an external perspective view of a three-dimensional shaping device 100 according to a first embodiment. FIG. 2 is a schematic cross-sectional view showing an internal configuration of the three-dimensional shaping device 100. The figures show arrows in X, Y, and Z directions which are orthogonal to each other. The X direction and the Y direction are directions in a horizontal direction and the Z direction is a direction in a vertical direction. Other figures show the arrows in the X, Y, and Z directions as appropriate.

As shown in FIGS. 1 and 2, the three-dimensional shaping device 100 includes a chamber 10, a heating unit 20, a base 30, a discharge unit 200, a first drive unit 50, a second drive unit 60, a first heat resistant member 70, a second heat resistance member 16, a temperature sensor 80, a cooling mechanism 90, a cooling control unit 110, and a shaping control unit 120. The cooling control unit 110 and the shaping control unit 120 may be configured integrally.

The chamber 10 has a shaping space 11 therein in which a three-dimensional shaped article is shaped. The chamber 10 includes a partition wall 12 surrounding the shaping space 11. The partition wall 12 includes a heat insulating material such as rock wool between an inner wall and an outer wall constituted by a metal such as stainless steel. With such a structure, the partition wall 12 insulates the shaping space 11 in the chamber 10.

An opening and closing door 15 is provided in a part of the partition wall 12 constituting a side surface of the chamber 10. The opening and closing door 15 has, for example, a double glass through which a three-dimensional shaped article being shaped in the shaping space 11 may be visually recognized from outside. The three-dimensional shaped article shaped in the shaping space 11 may be taken out to the outside by opening the opening and closing door 15. A first opening 13 is formed in the partition wall 12 constituting a lower surface of the chamber 10. A second opening 14 is formed in the partition wall 12 facing the first opening 13 of the chamber 10.

The heating unit 20 is coupled to the chamber 10 through an intake pipe 21 and an exhaust pipe 22. The heating unit 20 circulates and heats air in the shaping space 11 through the intake pipe 21 and the exhaust pipe 22, thereby adjusting temperature of the shaping space 11 to a predetermined temperature. In the present embodiment, the heating unit 20 adjusts the temperature in the shaping space 11 to a temperature of 120 to 150° C. The temperature may be higher than a glass transition point of a shaping material.

The base 30 is disposed in the chamber 10. The base 30 has a shaping surface 31 exposed to the shaping space 11. The shaping surface 31 is also referred to as a stage. The base 30 may include a mechanism configured to adjust an inclination and a height of the shaping surface 31. The base 30 may include a heater that heats the shaping surface 31.

In the shaping space 11 heated by the heating unit 20, the discharge unit 200 shapes the three-dimensional shaped article by discharging the shaping material toward the shaping surface 31 of the base 30 while moving in a first direction. The first direction is the horizontal direction in the present embodiment. The first direction may be inclined within a range of ±10 degrees relative to the horizontal direction, for example. The discharge unit 200 is also referred to as a head. A specific configuration of the discharge unit 200 will be described later. In the present embodiment, since the discharge unit 200 discharges the shaping material in the heated chamber 10, adhesion of the shaping material to the base 30 can be enhanced, and warpage due to rapid cooling of the shaping material can be prevented.

The first drive unit 50 moves the base 30 in a second direction crossing the first direction. In the present embodiment, the second direction is the vertical direction. The first drive unit 50 and the base 30 are coupled by a prop 51 constituting a part of the first drive unit 50. In the present embodiment, the first drive unit 50 includes a linear actuator including a ball screw as a shaft member and a motor that drives the ball screw. The second direction may be inclined, for example, in a range of ±10 degrees relative to the first direction.

The second drive unit 60 moves the discharge unit 200 in the horizontal direction. The second drive unit 60 is disposed at a position separated from the shaping space 11. In the present embodiment, the second drive unit 60 is provided at an upper surface of the chamber 10. In the present embodiment, the second drive unit 60 includes a first linear actuator 61 that moves the discharge unit 200 in the X direction, and a second linear actuator 62 that moves the discharge unit 200 in the Y direction. Each of the first linear actuator 61 and the second linear actuator 62 includes a ball screw and a motor that drives the ball screw. The second linear actuator 62 drives the discharge unit 200 along a pair of rails disposed in the Y direction that sandwich the second opening 14 opened in the upper surface of the chamber 10 in the X direction. The elongated first linear actuator 61 is stretched in the X direction on the rails and the discharge unit 200 is attached to the linear actuator 61.

The first opening 13 is formed in the lower surface of the chamber 10. The first heat resistant member is disposed between a peripheral part of the first opening 13 and the base 30.

Figure 3:
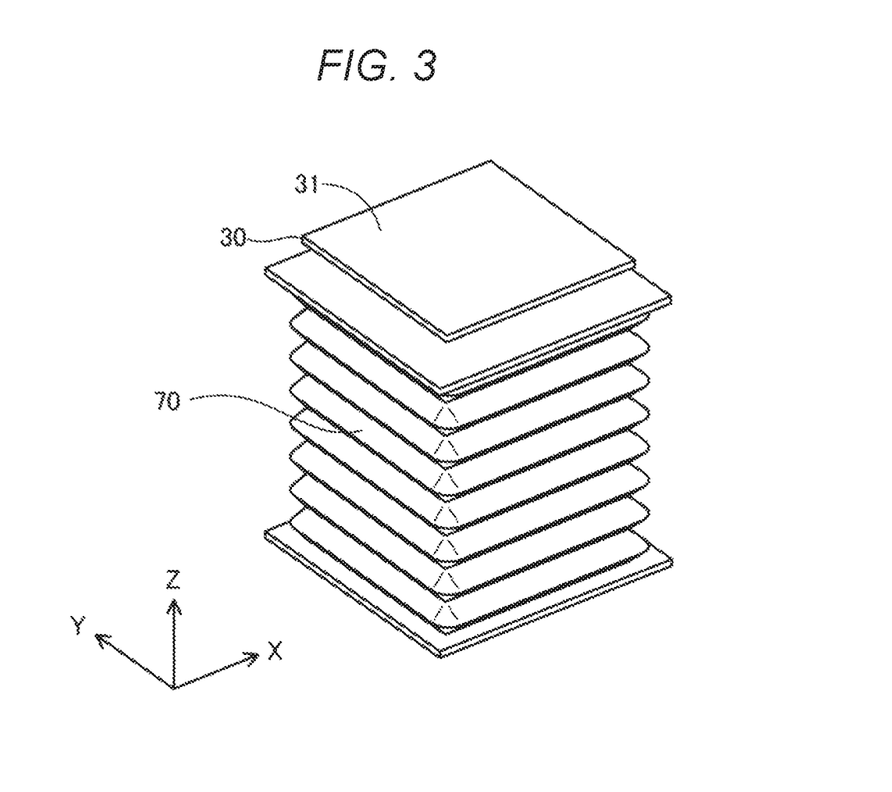
FIG. 3 is a perspective view showing an external structure of a first heat resistant member.
Figure 4:
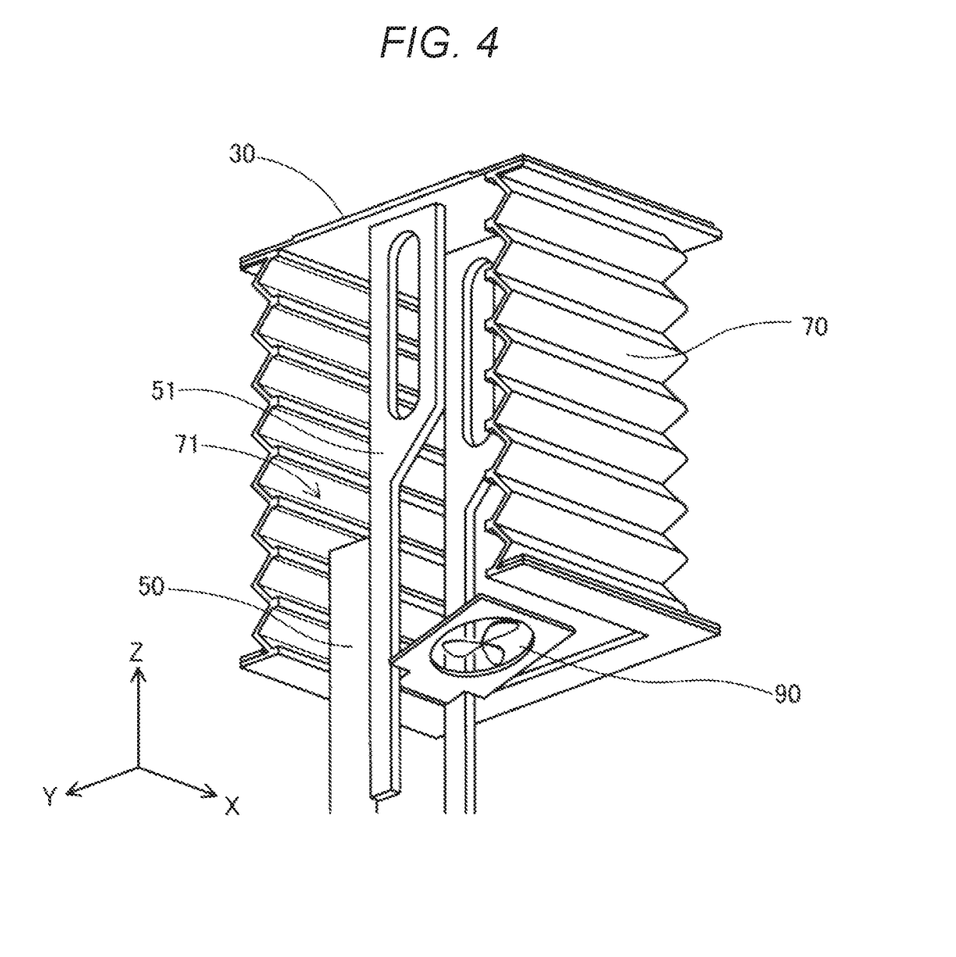
FIG. 4 is a perspective view showing an internal structure of the first heat resistant member.

FIG. 3 is a perspective view showing an external structure of the first heat resistant member 70. FIG. 4 is a perspective view showing an internal structure of the first heat resistant member 70. As shown in the figures, the first heat resistant member 70 has a bellows structure extendable in the Z direction. The first heat resistant member 70 extends and contracts in accordance with a movement of the base 30 in the Z direction. The first heat resistant member 70 has a tubular shape and forms a separation space 71 separated from the shaping space 11. At least a part of the first drive unit 50 that drives the base 30 is disposed in the separation space 71. In the present embodiment, the prop 51 constituting a part of a tip portion of the first drive unit 50 is disposed in the separation space 71. The entire first drive unit 50 may be disposed in the separation space 71. The first heat resistant member 70 has heat resistance for withstanding the temperature in the shaping space 11. In the present embodiment, the first heat resistant member 70 includes a silicone coating applied to a woven fabric of glass fibers. The configuration of the first heat resistant member 70 is not limited to the above and, for example, a fluororesin may be coated on the woven fabric of glass fibers instead of silicone.

As shown in FIG. 2, the second opening 14 is formed in an upper part of the chamber 10. The discharge unit 200 is disposed on the second opening 14. The second heat resistant member 16 is disposed between a peripheral part of the second opening 14 and the discharge unit 200.

Figure 5:
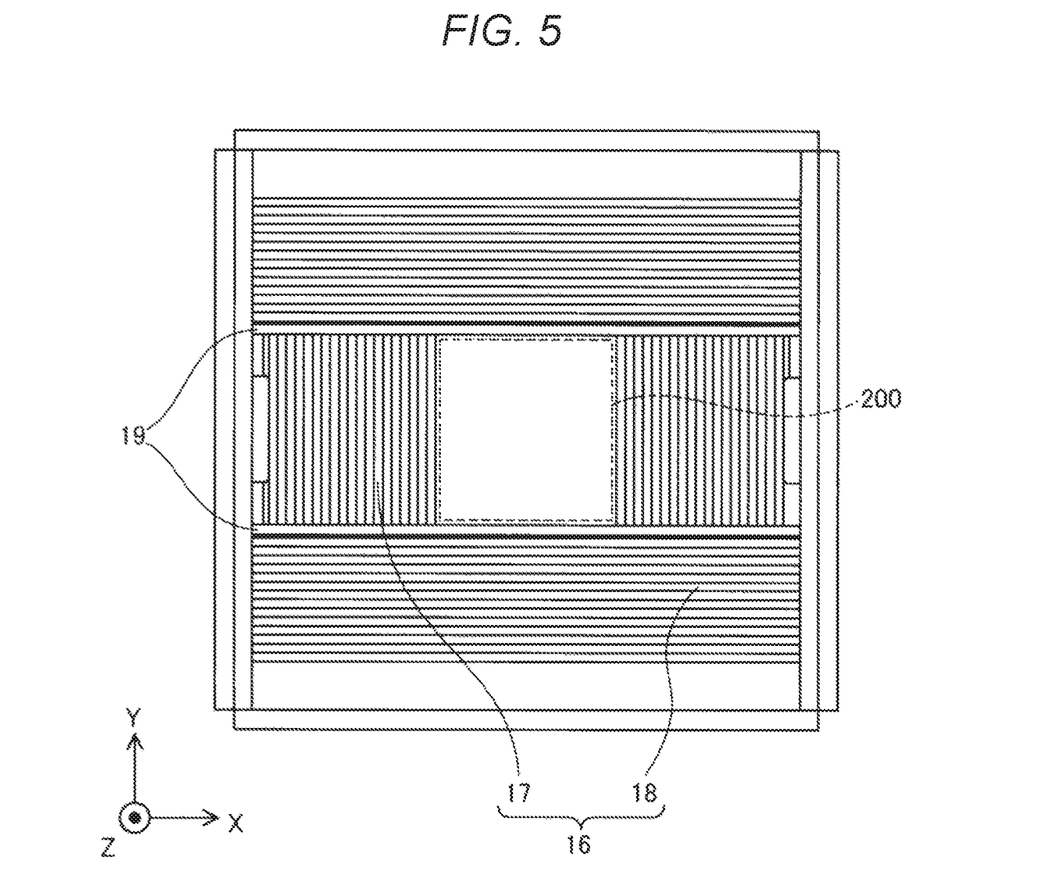
FIG. 5 is a plan view showing a configuration of a second heat resistant member.
Figure 6:
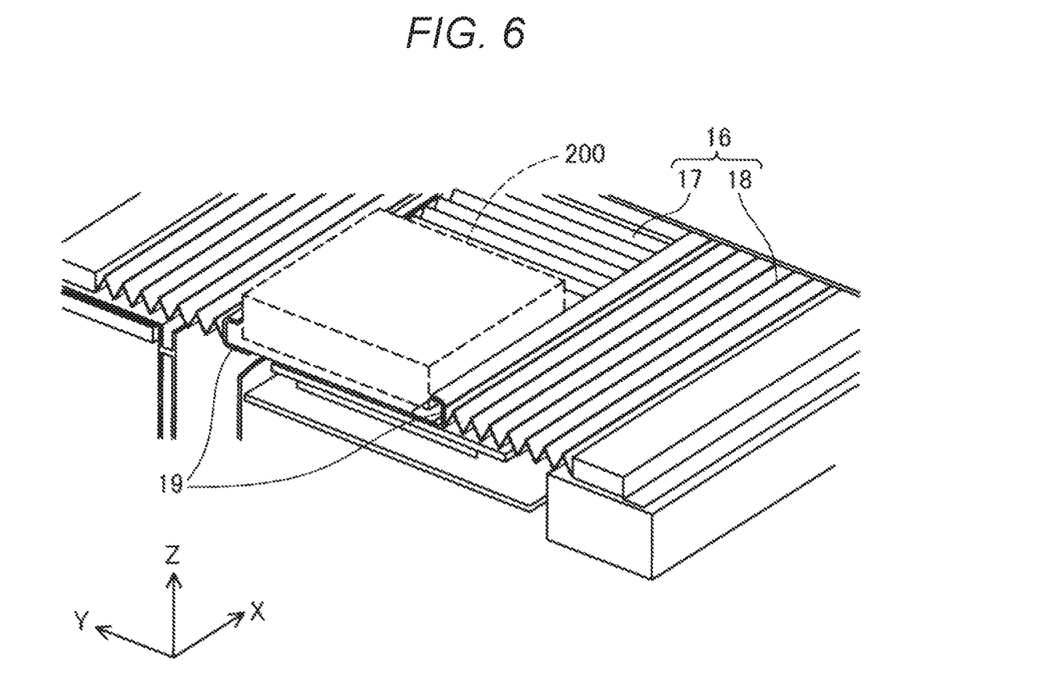
FIG. 6 is a perspective view showing a cross-sectional structure of the second heat resistant member.

FIG. 5 is a plan view showing a configuration of the second heat resistant member 16. FIG. 6 is a perspective view showing a cross-sectional structure of the second heat resistant member 16. In the figures, the second drive unit 60 is omitted. The second heat resistant member 16 has a structure that extends and contracts in the horizontal direction in accordance with the movement of the discharge unit 200 in the horizontal direction. In the second opening 14 to which the second heat resistant member 16 is attached, two rails 19 slidable in the Y direction are stretched in the X direction, and the discharge unit 200 is attached between the two rails 19 and is slidable in the X direction. The second heat resistant member 16 includes a first cover that extends and contracts in the X direction and a second cover 18 that extends and contracts in the Y direction. In the present embodiment, the first cover 17 and the second cover 18 have heat resistance for withstanding the temperature in the shaping space 11 and have a bellows structure that can extend and contract, which is similar to the first heat resistant member 70. A pair of first covers 17 are disposed to sandwich the discharge unit 200 in the X direction between the two rails 19. A pair of second covers 18 are disposed to sandwich the discharge unit 200 in the Y direction outside the two rails 19.

As shown in FIG. 2, the temperature sensor 80 is disposed in the separation space 71 inside the first heat resistant member 70. The temperature sensor 80 is a sensor that measures the temperature of the separation space 71. In the present embodiment, the temperature sensor 80 is attached to the prop 51.

The cooling mechanism 90 cools the separation space 71. In the present embodiment, the cooling mechanism 90 is constituted by a cooling fan. The cooling mechanism 90 is disposed in a lower part of the separation space 71 and blows air toward the separation space 71. A lower side of the first heat resistant member 70 is opened and air introduced into the separation space 71 by the cooling mechanism 90 is discharged to the outside from the lower side of the separation space 71. The cooling mechanism 90 may be a mechanism that sucks air in the separation space and discharges the air to the outside. The cooling mechanism 90 is not limited to the cooling fan and may be, for example, a pipe disposed in the separation space 71 through which a refrigerant flows.

The cooling control unit 110 controls the cooling mechanism 90 in accordance with the temperature of the separation space 71 measured by the temperature sensor 80. More specifically, the cooling control unit 110 performs feedback control of the cooling mechanism 90 to adjust the temperature in the separation space 71 so that the temperature in the separation space 71 measured by the temperature sensor 80 is a target temperature. In the present embodiment, the cooling control unit 110 sets a temperature of 50 to 60° C. as the target temperature. The target temperature is equal to or lower than a heat resistance temperature of the first drive unit 50 so that a movement error due to thermal strain in the vertical direction of the base 30 by the first drive unit 50 falls within a predetermined range. The cooling control unit 110 may be constituted by a circuit or a computer.

The shaping control unit 120 controls the discharge unit 200, the first drive unit 50, and the second drive unit 60 according to three-dimensional shaping data acquired from a recording medium, an external computer, or the like, thereby discharging the shaping material at a designated position on the shaping surface 31 of the base 30 and shaping the three-dimensional shaped article. The shaping control unit 120 is constituted by a computer and includes a CPU and a memory. The CPU executes a predetermined program stored in the memory to implement processing for shaping the three-dimensional shaped article. Some or all functions of the shaping control unit 120 may be implemented by a circuit.

Figure 7:
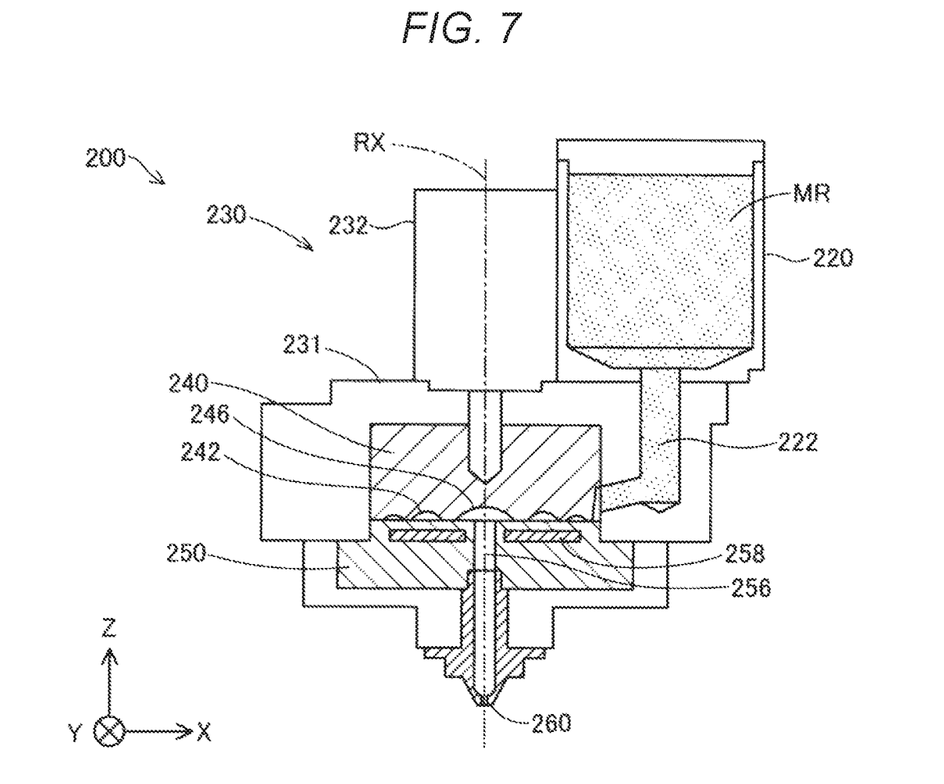
FIG. 7 is a schematic cross-sectional view showing a configuration of a discharge unit.

FIG. 7 is a schematic cross-sectional view showing a configuration of the discharge unit 200. The discharge unit 200 includes a material supply unit 220, which is a supply source of a material MR before being converted into the shaping material, a material melting unit 230 that melts the material MR to obtain the shaping material, and a nozzle 260 that discharges the shaping material toward the shaping surface 31.

The material supply unit 220 supplies the material MR for generating the shaping material to the material melting unit 230. The material supply unit 220 is formed of, for example, a hopper that contains the material MR. The material supply unit 220 is coupled to the material melting unit 230 via a communication path 222. The material MR is supplied to the material supply unit 220 in a form of, for example, pellets or powder. Details of the material MR will be described later.

The material melting unit 230 plasticizes the material MR supplied from the material supply unit 220 to generate a paste formed shaping material that exhibits fluidity, and guides the material to the nozzle 260. The material melting unit 230 includes a screw case 231, a drive motor 232, a flat screw 240, and a screw facing portion 250. The flat screw 240 is also referred to as a "scroll". The screw facing portion 250 is also referred to as a "barrel". The material melting unit 230 does not have to melt all types of materials constituting the shaping material. The material melting section 230 may convert the shaping material into a state having fluidity as a whole by melting at least a part of the materials constituting the shaping material.

The flat screw 240 has a substantially cylindrical shape whose height along a central axis RX is smaller than a diameter thereof. In the present embodiment, the flat screw 240 is disposed such that the central axis RX thereof is parallel to the Z direction.

The flat screw 240 is accommodated in the screw case 231. An upper surface side of the flat screw 240 is coupled to the drive motor 232, and the flat screw 240 rotates about the central axis RX in the screw case 231 by a rotational driving force generated by the drive motor 232. The drive motor 232 is driven under the control of the shaping control unit 120.

A groove portion 242 is formed at a lower surface of the flat screw 240. The communication path 222 of the material supply unit 220 communicates with the groove portion 242 from a side surface of the flat screw 240.

The lower surface of the flat screw 240 faces an upper surface of the screw facing portion 250. A space is defined between the groove portion 242 on the lower surface of the flat screw 240 and the upper surface of the screw facing portion 250. The material MR is supplied to the space from the material supply unit 220. Specific configurations of the flat screw 240 and the groove portion 242 will be described later.

A heater 258 that heats the material MR is embedded in the screw facing portion 250. The material MR supplied to the groove portion 242 of the flat screw 240 flows along the groove portion 242 by the rotation of the flat screw 240 while being melted in the groove portion 242, and is guided to a central portion 246 of the flat screw 240 as the shaping material. The paste formed shaping material flowing into the central portion 246 is supplied to the nozzle 260 via a communication hole 256 provided at the center of the screw facing portion 250.

The nozzle 260 is coupled to the communication hole 256 of the screw facing portion 250. The nozzle 260 discharges the shaping material generated in the material melting portion 230 toward the shaping surface 31.

Figure 8:
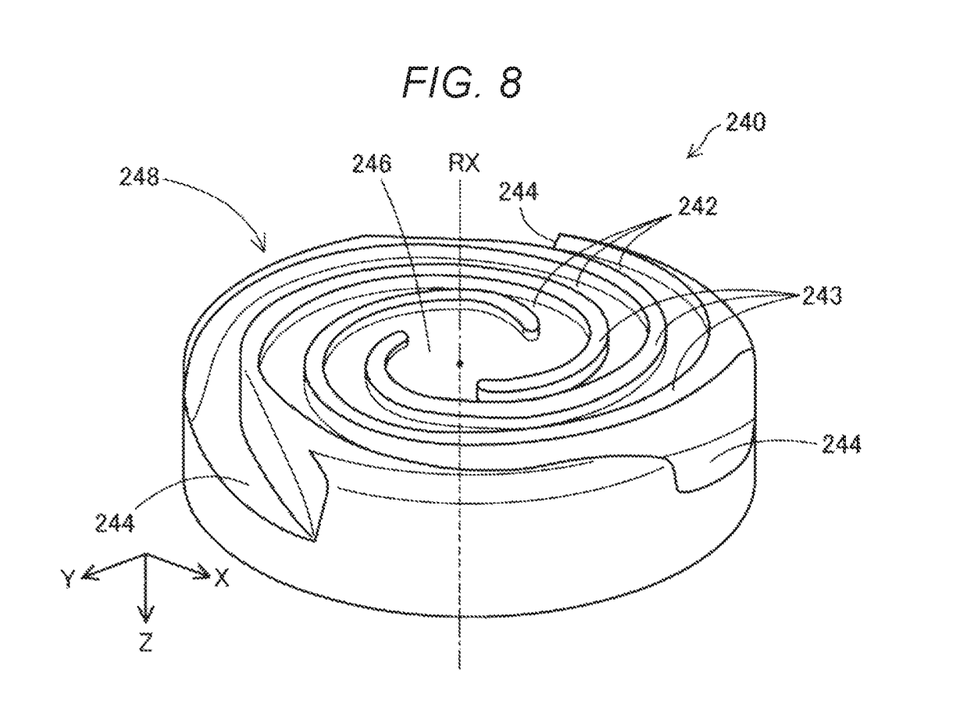
FIG. 8 is a schematic perspective view showing a configuration of a lower surface side of a flat screw.

FIG. 8 is a schematic perspective view showing a configuration of a lower surface side of the flat screw 240. In FIG. 8, a position of the central axis RX of the flat screw 240 is indicated by a chain line. The groove portion 242 is provided at the lower surface of the flat screw 240 facing the screw facing portion 250. Hereinafter, the lower surface of the flat screw 240 will be referred to as a "groove shaping surface 248".

The central portion 246 of the groove shaping surface 248 of the flat screw 240 is a recess to which one end of the groove portion 242 is coupled. The central portion 246 faces the communication hole 256 of the screw facing portion 250. In the first embodiment, the central portion 246 intersects the central axis RX.

The groove portion 242 of the flat screw 240 constitutes a so-called scroll groove. The groove portion 242 extends in a manner of a whirl from the central portion 246 and draws an arc toward an outer periphery of the flat screw 240. The groove portion 242 may extend spirally. The groove shaping surface 248 is provided with a ridge portion 243 that forms a side wall portion of the groove portion 242 and extends along each groove portion 242.

The groove portion 242 is coupled to a material inlet 244 formed at the side surface of the flat screw 240. The material inlet 244 is a part that receives the material MR supplied via the communication path 222 of the material supply unit 220.

FIG. 8 shows an example of the flat screw 240 having three groove portions 242 and three ridge portions 243. The numbers of the groove portions 242 and the ridge portions 243 provided in the flat screw 240 are not limited to three. Only one groove portion 242 may be provided, or that two or more groove portions 242 may be provided at the flat screw 240. Any number of the ridge portion 243 may be provided in accordance with the number of the groove portion 242.

FIG. 8 illustrates an example of the flat screw 240 in which the material inlet 244 is formed at three locations. The number of the material inlet 244 provided at the flat screw 240 is not limited to three. The material inlet 244 may be provided at only one location or two or more locations of the flat screw 240.

Figure 9:
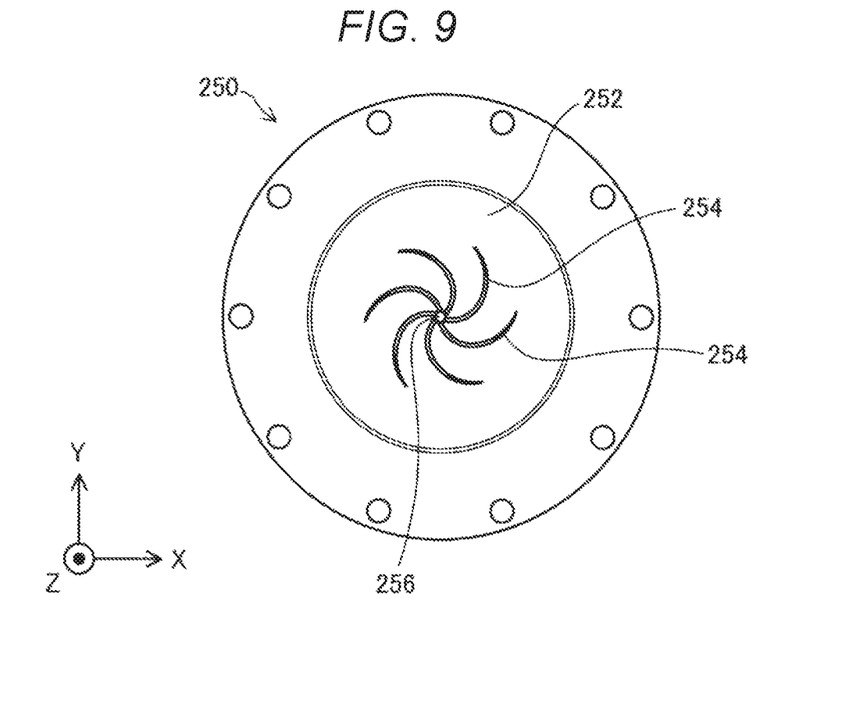
FIG. 9 is a schematic plan view showing a configuration of an upper surface side of a screw facing portion.

FIG. 9 is a schematic plan view showing a configuration of an upper surface side of the screw facing portion 250. The upper surface of the screw facing portion 250 faces the groove shaping surface 248 of the flat screw 240 as described above. Hereinafter, the upper surface of the screw facing portion 250 is referred to as a "screw facing surface 252". The communication hole 256 that supplies the shaping material to the nozzle 260 is formed at a center of the screw facing surface 252.

A plurality of guide grooves 254 that are coupled to the communication hole 256 and extend in a manner of a whirl from the communication hole 256 toward an outer periphery are formed in the screw facing surface 252. The plurality of guide grooves 254 have a function of guiding the shaping material flowing into the central portion 246 of the flat screw 240 to the communication hole 256.

When the flat screw 240 rotates, the material MR supplied from the material inlet 244 is guided by the groove portion 242 and moves toward the central portion 246 while being heated in the groove portion 242. The closer the material MR to the central portion 246, the further the material MR is melted, increases in fluidity, and is converted into the shaping material. The shaping material collected in the central portion 246 flows out from the communication hole 256 to the nozzle 260 due to internal pressure generated in the central portion 246.

Figure 10:
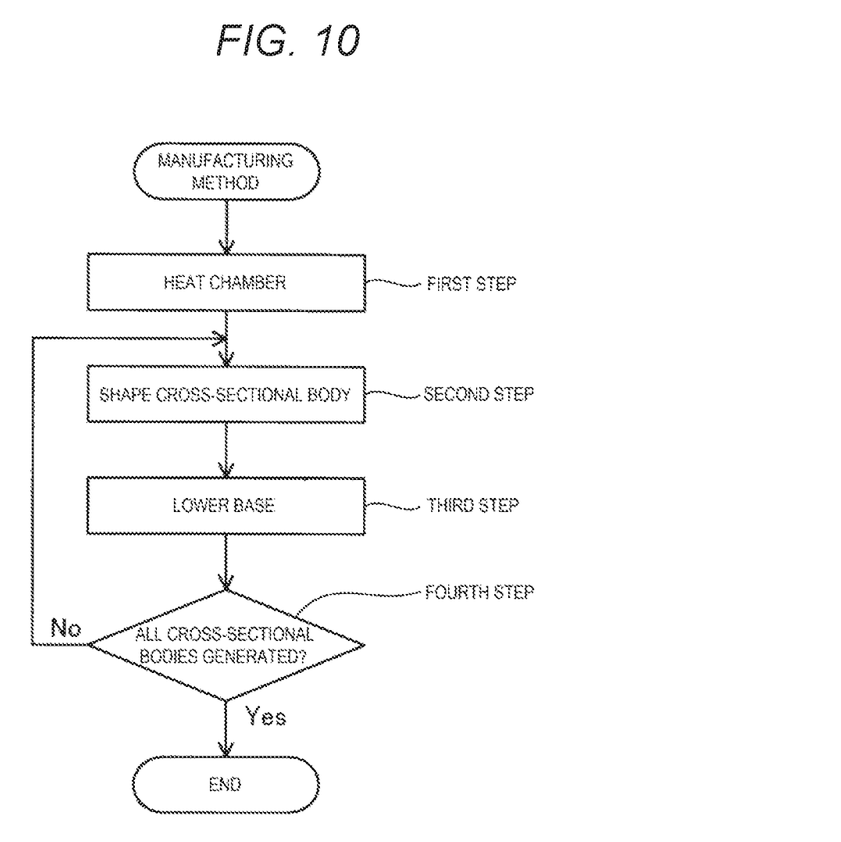
FIG. 10 is a process diagram of a three-dimensional shaped article manufacturing method.

FIG. 10 is a process diagram of a manufacturing method for the three-dimensional shaped article. In the first step, the heating unit 20 heats the shaping space 11 in the chamber 10. In the first step, the cooling control unit 110 adjusts the temperature of the separation space 71 in the first heat resistance member 70 to a target temperature by controlling the cooling mechanism 90.

In the second step, in accordance with the three-dimensional shaping data, the shaping control unit 120 controls the second drive unit 60 to move the discharge unit 200 in the horizontal direction and, at the same time, causes the shaping material to be discharged from the discharge unit 200 to the shaping surface 31, thereby shaping a cross-sectional body of one layer of the three-dimensional shaped article represented by the three-dimensional shaping data.

In the third step, the shaping control unit 120 controls the first drive unit 50 to lower the base 30 in the vertical direction by one layer. In the third step, the first heat resistant member 70 provided in the chamber 10 contracts in the vertical direction in accordance with the movement of the base 30 in the vertical direction.

In the fourth step, the shaping control unit 120 determines whether all cross-sectional bodies included in the three-dimensional shaping data are generated. If all of the cross-sectional bodies are generated, the manufacturing method ends. If all of the cross-sectional bodies are not generated, the shaping control unit 120 repeats the second to fourth steps.

According to the three-dimensional shaping device 100 in the present embodiment described above, at least a part of the first drive unit 50 that moves the base 30 in the vertical direction is disposed in the separation space 71 in the first heat resistant member 70 separated from the shaping space 11 in the chamber 10. Therefore, it is possible to prevent thermal influence of heated air in the chamber 10 from affecting the first drive unit 50. Since the first drive unit 50 is a drive unit that moves the base 30 up and down, the gap between the base 30 and the discharge unit 200 changes due to expansion of the shaft member provided in the first drive unit 50 when the first drive unit 50 is thermally affected, which may affect shaping accuracy of the three-dimensional shaped article. However, in the present embodiment, since at least a part of the first drive unit 50 is disposed in the separation space 71 of the first heat resistant member 70, thermal strain of the first drive unit 50 due to heated air in the chamber 10 can be prevented and the shaping accuracy of the three-dimensional shaped article can be improved.

Further, in the present embodiment, since the cooling mechanism 90 is provided in the separation space 71, it is possible to more effectively prevent the thermal influence of heated air in the chamber 10 from affecting the first drive unit 50. Moreover, in the present embodiment, the temperature in the separation space 71 can be prevented from varying since the temperature sensor 80 is disposed in the separation space 71 and the cooling by the cooling mechanism 90 is controlled based on the temperature measured by the temperature sensor 80. As a result, variation in thermal strain of the first drive unit 50 can also be prevented and the shaping accuracy of the three-dimensional shaped article can be improved.

Further, in the present embodiment, expansion and contraction of the first heat resistant member 70 can follow the movement of the base 30 with a simple configuration since the first heat resistant member 70 has the bellows structure.

Further, in the present embodiment, it is possible to prevent thermal influence of heated air in the chamber 10 from affecting the second drive unit 60 since the second drive unit 60 that drives the discharge unit 200 in the horizontal direction is disposed outside the chamber 10 and the second heat resistance member 16 is disposed between the second opening 14 of the chamber 10 and the discharge unit 200. Therefore, it is possible to improve the shaping accuracy of the three-dimensional shaped article.

Further, in the present embodiment, a height of the discharge unit 200 can be decreased since the material melting unit 230 is constituted by the flat screw 240. Therefore, it is possible to reduce a size of the three-dimensional shaping device 100.

Here, a material for the three-dimensional shaped article used in the three-dimensional shaping device 100 described above will be described. In the three-dimensional shaping device 100, for example, a three-dimensional shaped article can be shaped using various materials such as a thermoplastic material, a metal material, and a ceramic material as a main material. Here, the "main material" means a main material for shaping the shape of the three-dimensional shaped article, and means a material that occupies 50% or more by weight in the three-dimensional shaped article. The shaping material described above includes a material obtained by melting the main material alone or a material in a paste form obtained by melting a part of components mixing with the main material.

When a thermoplastic material is used as the main material, the shaping material is generated by plasticizing the material in the material melting unit 230. "Plasticizing" means applying heat to the thermoplastic material to melt the thermoplastic material.

For example, the following thermoplastic resin materials can be used as the thermoplastic material.

Example of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide and polyether ether ketone Additives such as a wax, a flame retardant, an antioxidant, or a heat stabilizer may be mixed into the thermoplastic material in addition to a pigment, a metal and a ceramic. The thermoplastic material is converted into a melted state after being plasticized in the material melting unit 230 by the rotation of the flat screw 240 and the heating of the heater 258. The shaping material generated by melting the thermoplastic material is discharged from the nozzle 260 and then hardened by a decrease in temperature.

The thermoplastic material may be emitted from the nozzle 260 in a state of being heated at the glass transition point of the thermoplastic material or more and being completely melted. For example, the ABS resin, which has a glass transition temperature of about 120° C., may be about 200° C. when discharged from the nozzle 260. In order to discharge the shaping material under such a high temperature, a heater may be provided around the nozzle 260.

The following metal materials, for example, may be used as the main material in the three-dimensional shaping device 100 instead of the above-described thermoplastic material. In this case, a powder material obtained by converting the following metal materials into a powder form may be mixed with a component that melts at the time of generating the shaping material and be put into the material melting unit 230 as the material MR.

Example of Metal Material

A single metal of magnesium (Mg), iron (Fe), cobalt (Co), chromium (Cr), aluminum (Al), titanium (Ti), copper (Cu), and nickel (Ni), or an alloy containing one or more of the metals Example of Alloy Maraging steel, stainless steel, cobalt chrome molybdenum, titanium alloy, nickel alloy, aluminum alloy, cobalt alloy, and cobalt chromium alloy A ceramic material may be used as the main material in place of the above-described metal material in the three-dimensional shaping device 100. As the ceramic material, for example, an oxide ceramic such as silicon dioxide, titanium dioxide, aluminum oxide, and zirconium oxide, or a non-oxide ceramic such as aluminum nitride may be used. When a metal material or a ceramic material as described above is used as the main material, the shaping material discharged onto the shaping surface 31 may be hardened by sintering.

A powder material of the metal material or the ceramic material to be supplied as the material MR to the material supply unit 220 may be a mixed material obtained by mixing a plurality of types of powder of a single metal, an alloy, and a ceramic material. The powder material of the metal material or the ceramic material may be coated with, for example, a thermoplastic resin as exemplified above or a thermoplastic resin other than those exemplified above. In this case, in the material melting unit 230, the thermoplastic resin may be melted and exhibit fluidity.

For example, the following solvents may be added to the powder material of the metal material or the ceramic material to be supplied to the material supply unit 220 as the material MR. One solvent or a combination of two or more solvents selected from the following solvents may be used.

Example of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates such as tetrabutylammonium acetate); and ionic liquids such as butyl carbitol acetate In addition, the following binders, for example, may be added to the powder material of the metal material or the ceramic material that is put into the material supply unit 220 as the material MR.

Example of Binder

Acrylic resin, epoxy resin, silicone resin, cellulose-based resin, or other synthetic resin, or polylactic acid (PLA), polyamide (PA), polyphenylene sulfide (PPS), polyether ether ketone (PEEK), or other thermoplastic resins.

B. Second Embodiment

Figure 11:
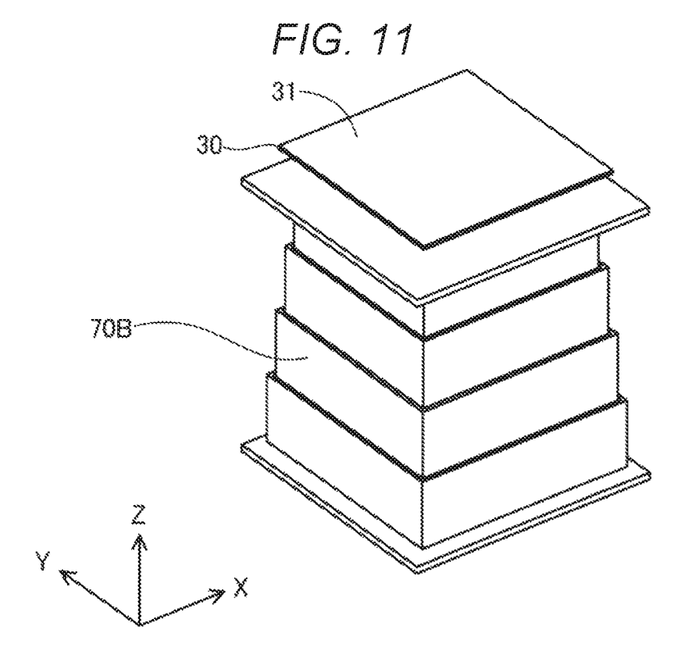
FIG. 11 is a perspective view of a first heat resistant member in a second embodiment.

FIG. 11 is a perspective view of a first heat resistant member 70B according to a second embodiment. In the first embodiment described above, the first heat resistant member 70 has a bellows structure. In contrast, in the second embodiment, the first heat resistant member 70B has a telescopic structure including a plurality of continuously overlapping frame-shaped members. According to the structure of the first heat resistant member 70B, the separation space 71 in the first heat resistant member 70B can also be separated from the shaping space 11 in the chamber 10.

C. Third Embodiment

Figure 12:
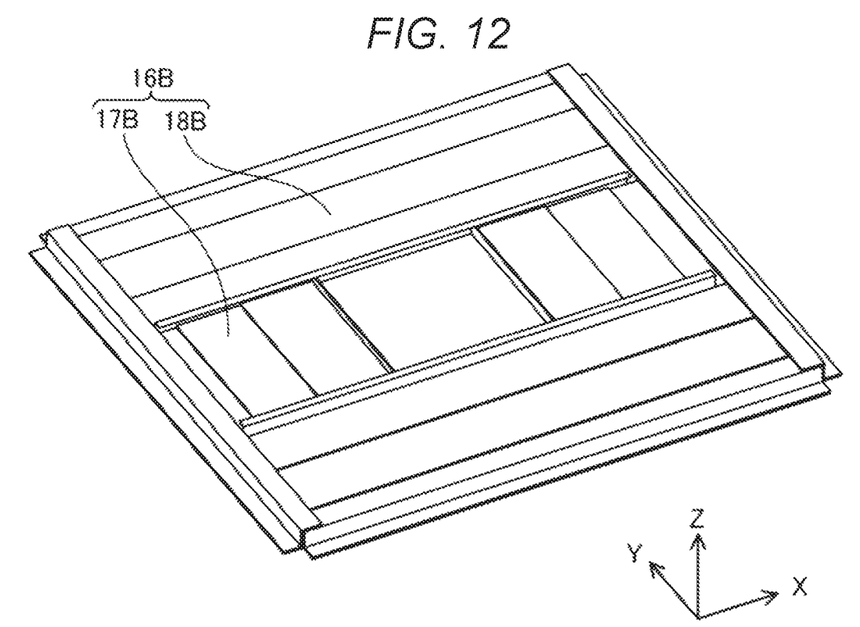
FIG. 12 is a perspective view of a second heat resistant member in a third embodiment.
Figure 13:
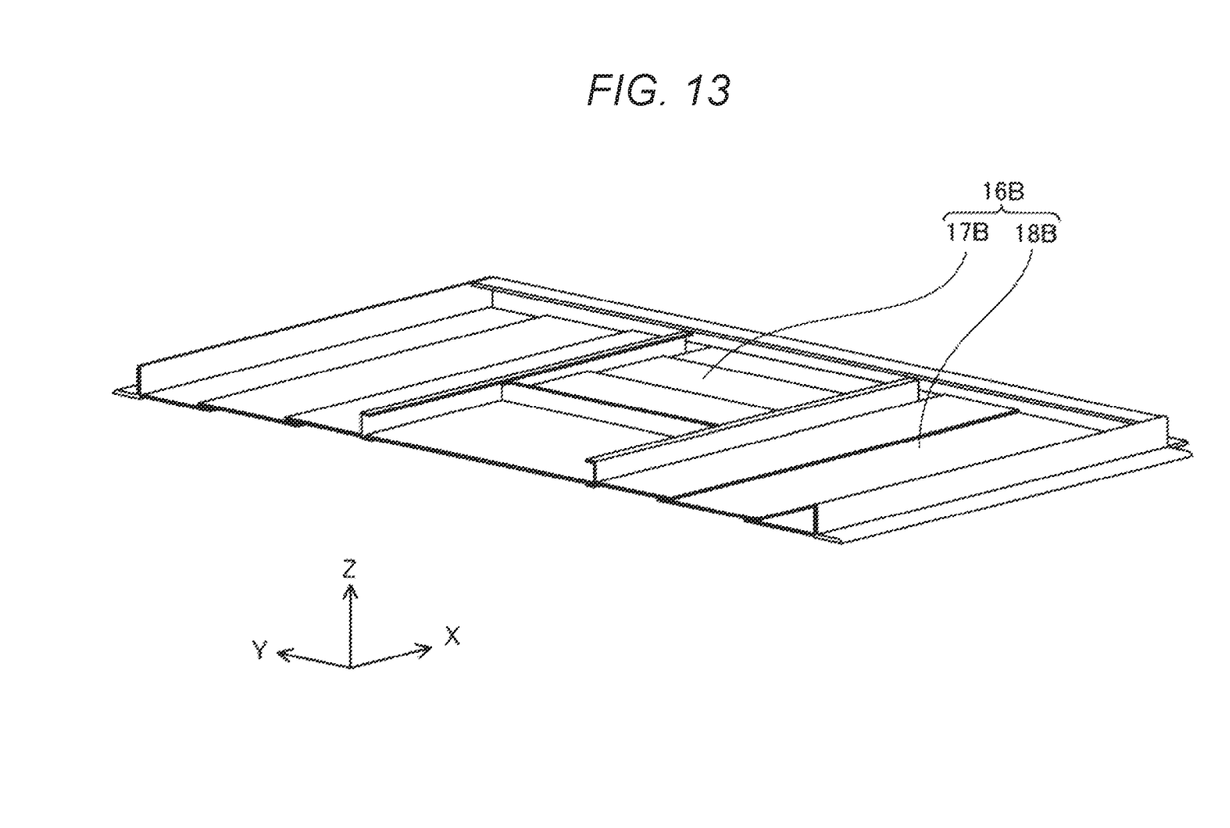
FIG. 13 is a perspective view showing a cross-sectional structure of the second heat resistant member in the third embodiment.

FIG. 12 is a perspective view of a second heat resistant member 16B according to a third embodiment. FIG. 13 is a perspective view showing a cross-sectional structure of the second heat resistant member 16B. In the first embodiment described above, the second heat resistant member disposed around the discharge unit 200 has a bellows structure. In contrast, in the third embodiment, the second heat resistant member 16B has a telescopic structure including a plurality of continuously overlapping plate-shaped members.

The second heat resistant member 16B includes a first cover 17B that extends and contracts in the X direction and a second cover 18B that extends and contracts in the Y direction. In the present embodiment, each of the first cover 17B and the second cover 18B has a telescopic structure. A pair of first covers 17B are disposed to sandwich the discharge unit 200 in the X direction. A pair of second covers 18B are disposed to sandwich the discharge unit 200 in the Y direction.

With such a structure of the second heat resistant member 16B, it is possible to prevent the thermal influence of heated air in the chamber 10 from affecting the second drive unit 60. The telescopic structure can also be referred to as a shutter structure.

D. Other Embodiment (D-1) In the embodiments described above, the discharge unit 200 plasticizes the material by the flat screw 240. In contrast, for example, the discharge unit 200 may plasticize the material by rotating an in-line screw. In addition, a head used in a thermal dissolution lamination method (FDM) may be adopted as the discharge unit 200.

(D-2) In the above embodiments, the three-dimensional shaping device 100 includes the cooling mechanism 90, the temperature sensor 80, and the cooling control unit 110. In contrast, the three-dimensional shaping device 100 may not include the cooling mechanism 90, the temperature sensor 80, and the cooling control unit 110 when a sufficient heat insulating effect is obtained by the first heat resistant member 70. The three-dimensional shaping device 100 may cool the separation space 71 only by the cooling mechanism 90 without using the temperature sensor 80 and the cooling control unit 110.

(D-3) In the above embodiments, the heating unit 20 performs heating while circulating air through the intake pipe 21 and the exhaust pipe 22. In contrast, the heating unit 20 may be a heater attached to the partition wall 12 of the chamber 10.

E. Other Forms

The present disclosure is not limited to the embodiments described above and can be implemented in various forms without departing from the scope of the present disclosure. For example, the present disclosure can be implemented as the following forms. In order to solve a part or all of the problems described in the present disclosure, or to achieve a part or all of the effects of the present disclosure, technical features of the embodiments described above corresponding to technical features to be described below of the embodiments can be replaced or combined as appropriate. In addition, unless described as essential herein, the technical features can be deleted as appropriate.

(1) According to a first aspect of the present disclosure, a three-dimensional shaping device is provided. The three-dimensional shaping device includes a chamber that has a shaping space; a heating unit configured to heat the shaping space; a base that has a shaping surface exposed to the shaping space; a discharge unit configured to discharge a shaping material toward the shaping surface while moving in a first direction in the shaping space heated by the heating unit and shape a three-dimensional shaped article; a first drive unit configured to move the base in a second direction crossing the first direction; and a tubular first heat resistant member that is disposed between a peripheral part of a first opening formed in a partition wall of the chamber and the base, configured to extend and contract in the second direction in accordance with a movement of the base in the second direction, and defines a separation space separated from the shaping space, in which at least a part of the first drive unit is disposed in the separation space.

According to the aspect, since the first drive unit configured to move the base is disposed in the separation space in the first heat resistant member separated from the shaping space in the chamber, it is possible to prevent thermal influence of heated air in the chamber from affecting the first drive unit.

(2) The three-dimensional shaping device according to the above aspect further includes a cooling mechanism configured to cool the separation space. According to the aspect, it is possible to effectively prevent the thermal influence of heated air in the chamber from affecting the first drive unit.

(3) The three-dimensional shaping device according to the above aspect further includes a temperature sensor configured to measure a temperature of the separation space; and a cooling control unit configured to control the cooling mechanism in accordance with the temperature of the separation space measured by the temperature sensor. According to the aspect, it is possible to more effectively prevent the thermal influence of heated air in the chamber from affecting the first drive unit.

(4) In the three-dimensional shaping device according to the above aspect, the cooling mechanism may be a cooling fan. According to the aspect, the cooling mechanism can be simply configured.

(5) In the three-dimensional shaping device according to the above aspect, the first heat resistant member has a bellows structure or a telescopic structure configured to extend and contract in the second direction. According to the aspect, expansion and contraction of the first heat resistant member can follow the movement of the base with a simple configuration.

(6) The three-dimensional shaping device according to the above aspect further includes a second drive unit that is disposed at a position separated from the shaping space and is configured to move the discharge unit in the first direction; and a second heat resistant member that is disposed between a peripheral part of a second opening formed in a partition wall facing the first opening of the chamber and the discharge unit and extends and contracts in the first direction in accordance with a movement of the discharge unit in the first direction. According to the aspect, it is possible to prevent thermal influence of heated air in the chamber from affecting the second drive unit that moves the discharge unit.

(7) In the three-dimensional shaping device according to the above aspect, the second heat resistant member has a bellows structure or a telescopic structure configured to extend and contract in the first direction. According to the aspect, extension and contraction of the second heat resistant member can follow the movement of the discharge unit with a simple configuration.

(8) According to a second aspect of the present disclosure, a manufacturing method for a three-dimensional shaped article is provided. The manufacturing method includes a first step of heating a shaping space in a chamber using a heating unit; a second step of discharging a shaping material, which is a material of the three-dimensional shaped article, toward a shaping surface of a base while moving a discharge unit in the first direction, the shaping surface being exposed to the shaping space; and a third step of moving the base in a second direction intersecting the first direction by the first drive unit, in which in the third step, a tubular first heat resistant member, which is disposed between a peripheral part of a first opening formed in a partition wall of the chamber and the base and which defines a separation space separated from the shaping space, extends and contracts in the second direction in accordance with a movement of the base in the second direction, at least a part of the first drive unit being disposed in the separation space. According to the aspect, since the first drive unit configured to move the base is disposed in the separation space in the first heat resistant member separated from the shaping space in the chamber, it is possible to manufacture the three-dimensional shaped article while preventing thermal influence of heated air in the chamber from affecting the first drive unit.

The present disclosure is not limited to the three-dimensional shaping device and the manufacturing method for a three-dimensional shaped article described above, and may be implemented in various forms. For example, the present disclosure can be implemented in a form of a shaping method for a three-dimensional shaped article, a control method for a three-dimensional shaping device, a computer program for shaping a three-dimensional shaped article, a non-transitory tangible recording medium recording a computer program, and the like.

What is claimed is:

1. A three-dimensional shaping device comprising:
a chamber that has a shaping space;
a heater configured to heat the shaping space;
a base that has a shaping surface provided in the shaping space;
a discharge head configured to discharge a shaping material toward the shaping surface while moving in a first direction in the shaping space heated by the heater and shape a three-dimensional shaped article;
a first linear actuator configured to move the base in a second direction crossing the first direction; and
a tubular first heat resistant member that is attached to a peripheral part of a first opening formed in a partition wall of the chamber, the tubular first heat resistant member including a first end attached to the peripheral part of the first opening, sidewalls that extend from the first end in a direction toward the base, and a closed second end, the first end, sidewalls, and closed second end collectively defining a separation space that is separate from the shaping space,
wherein the sidewalls are configured to extend and contract in the second direction in accordance with a movement of the first linear actuator in the second direction, and,
the base is located atop the closed second end so as to be entirely located in the shaping space,
at least a part of the first linear actuator is disposed in the separation space, and
a cooling fan is provided in the separation space that is configured to cool the separation space.

2. The three-dimensional shaping device according to claim 1, further comprising:
a temperature sensor configured to generate a signal indicative of a temperature of the separation space; and
a cooling controller including either a circuit or computer that is configured to control the cooling fan in accordance with the signal indicative of the temperature of the separation space generated by the temperature sensor.

3. The three-dimensional shaping device according to claim 1, wherein
the first heat resistant member has a bellows structure or a telescopic structure configured to extend and contract in the second direction.

4. The three-dimensional shaping device according to claim 1, further comprising:
a second linear actuator that is disposed at a position separated from the shaping space and is configured to move the discharge head in the first direction; and
a second heat resistant member that is disposed between a peripheral part of a second opening formed in a partition wall facing the first opening of the chamber and the discharge head and extends and contracts in the first direction in accordance with a movement of the discharge head in the first direction.

5. The three-dimensional shaping device according to claim 4, wherein
the second heat resistant member has a bellows structure or a telescopic structure configured to extend and contract in the first direction.

* * * * *